May 10, 1927.  
D. M. FREEMAN  
1,627,642  
IMPLEMENT FOR MAKING COATED CONFECTIONS  
Original Filed Dec. 9, 1924
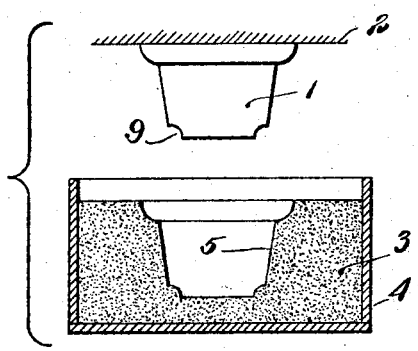
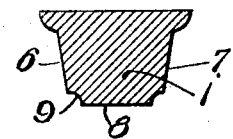
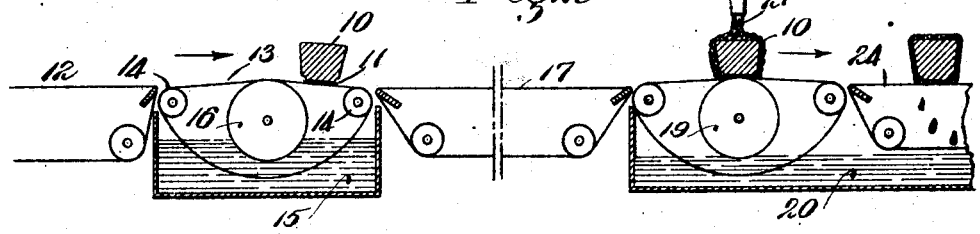
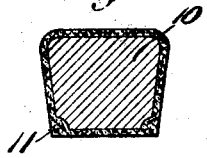
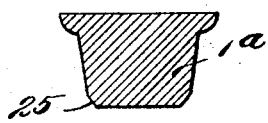
Inventor  
Deane M. Freeman  
by Roberts, Cushman + Woodbury.  
Attys.

Patented May 10, 1927.

1,627,642

UNITED STATES PATENT OFFICE.

DEANE M. FREEMAN, OF BROOKLINE, MASSACHUSETTS.

IMPLEMENT FOR MAKING COATED CONFECTIONS.

Original application filed December 9, 1924, Serial No. 754,759. Divided and this application filed March 12, 1926. Serial No. 94,161.

This invention relates to articles of confection and a process of making the same, and the present application is a division of my prior application filed December 9, 1924, Serial No. 754,759.

Confection is at present coated in two ways either by hand or by machines especially constructed for the purpose. The hand-coated confection is considered the best by the trade, not only because of its more pleasing esthetic appearance due to the symmetry of the outer surface but also because the center or form is coated more uniformly and evenly throughout. Although the hand-coated confection is preferable for the above reasons, nevertheless for quantity production, machine-coated confection is exceedingly desirable.

The foremost objection to the machine-coated confection is that its appearance is not so pleasing and attractive as that of the hand-coated confection because in the former small projecting fins commonly termed "feet" and "tails" are quite frequently formed owing to the over-abundant coating material on the center, and these fins enable the two confections to be easily distinguished. This is not only objectionable from an esthetic standpoint but when a number of confections coated in this manner are arranged in close juxtaposition in a box these projecting fins frequently crack off, thereby rendering the product unsightly and materially detracting from its intrinsic quality.

The present invention is adapted to facilitate the provision of a center or form which may be coated either by machine or by hand, preferably the former, and which when finally coated will have no projecting fins or "feet" and furthermore to permit the manufacture of a coated confection, the coating of which has certain corner portions reinforced to prevent the breaking or cracking of these corners in the handling and packing of the confection. To this end the invention more particularly discloses a new and improved implement used in the manufacture of coated confection, having unique features which permit the manufacture of confection having the above described desirable attributes.

The invention is shown by way of illustration in the accompanying drawings, in which,—

Fig. 1 is a sectional view of a mold for forming the centers in the first step in the manufacture of coating confection;

Fig. 2 is a diagrammatic view showing a machine for coating confection;

Fig. 3 is a cross sectional view of the cavity-forming implement shown in Fig. 1;

Fig. 4 is a cross sectional view of a confection finally coated; and

Fig. 5 is a modified form of a cavity-forming implement.

In the manufacturing of coated confection the first step consists of impressing an implement 1 usually adhesively connected to a supporting bed 2 into suitable material 3, such as corn starch, contained in a receptacle 4 thereby forming a cavity 5 into which a predetermined amount of the material forming the center of the confection is poured, the material usually being of a relatively heavy and viscous nature. The implement 1 may be round, oval, rectangular, or of any desired outline in cross section. As particularly indicated in Fig. 3 the opposite sides 6 and 7 of the implement 1 taper divergingly toward the end or bottom 8, the corners formed by the end 8 and sides 6 and 7 being cut away entirely around the outer periphery of the implement to form a concave groove 9. It will be apparent that after the material is poured into the cavity 5 formed by the implement 1 a center 10 is formed having a cut-away portion or groove 11 corresponding to the groove 9, the purpose and advantage of which will be hereinafter described.

In practice the centers 10 are initially placed on a conveyor 12 which may be in the form of an endless belt, the bottom 8 surrounded by the cut-away portion resting on the conveyor. From the conveyor 12 the centers 10 are conducted to an endless wire screen belt 13 which may be driven by suitable rolls 14 supported above a bath 15 of the liquid coating material. Dipping into the bath 15 and engaging at its upper surface the screen belt 13 is a rotating applying roll 16 to which the coating material adheres so that as the centers 10 are conveyed over the rolls 16 the bottoms thereof become coated as indicated at the left in Fig. 2. Thereafter the centers 10 are carried by a conveyor 17 which may be driven in any suitable manner to another screen belt 18 similar to the screen belt 13 with which is associated a rotating applying roll 19 dipping into a bath 20 of the coating material. It will thus be observed that the bottoms of the centers 10 are again coated, thus insuring the application of sufficient coating completely to cover the bottom.

Concomitantly with the second coating of the bottom the center 10 is conducted under a curtain 21 of the coating material, this curtain being formed in any suitable manner such as by a nozzle 22 connected to a reservoir 23. The excess or over-abundant coating material flows through the screen belt 18 and into the bath 20 from which a portion of the material may be conveyed in any suitable manner back into the reservoir 23. Although at this point the center 10 is completely coated there is an excess amount of the material on the sides thereof and for removing this excess amount the coated center is carried to a shaker screen belt 24 which is rapidly moved up and down contemporaneously with a movement in a horizontal direction, thus shaking or agitating the coated center to force the excess coating material cohering to the sides into the bath 20. From the shaker screen 24 the coated center may be carried to a suitable place for the coating thoroughly to dry.

The operation of the shaker screen will serve to remove the excess of coating material, but will also cause the coating which remains to tend to accumulate to some extent near the bottom of the piece. There will also be a certain downward flow of the coating until the latter has cooled to such an extent that it hardens. Before there can be any formation of the so-called "feet" or "fins", however, the peripheral recess at the bottom of the piece must be filled and this is formed of such size as to permit the reception therein of all surplus coating material, with the result that a piece having a smooth bounding surface without undesirable projections is secured. In the case of pieces whose shape is such that in packing or shipment the edges or corners are liable to breakage, the thickened coating at the bottom provides a reenforcement which greatly lessens the chance of such damage occurring.

Instead of forming the implement with a concave groove as above described the corners may simply be cut away at an angle or beveled as indicated at 25 on the implement 1ª in Fig. 5. The effect obtained will, however, be the same.

The invention is not only applicable to machine-coated centers, but is also well adapted to hand-coated centers as well, where it will considerably facilitate operations.

It should be understood that while there is herein described one specific embodiment which the invention may assume in practice, together with a modification, such embodiments are merely illustrative and the invention may be modified and embodied in various other forms without departing from its spirit or the scope of the appended claims.

I claim:

1. An implement for forming cavities in suitable material to receive the filling for a confection, said implement comprising a solid having a peripheral surface and a bottom surface, the peripheral surface and the edges of said bottom surface being cut away to provide an undercut.

2. An implement for forming cavities in suitable material to provide a mold for the centers of coated candies comprising a solid of suitable form, an attaching flange at one end thereof, said solid having at the other end thereof sides tapering relatively abruptly from points adjacent the other end thereof to the line of juncture with said other end.

Signed by me at Boston, Massachusetts, this twenty-fifth day of February, 1926.

DEANE M. FREEMAN.